United States Patent
Yamazaki et al.

(10) Patent No.: US 8,537,525 B2
(45) Date of Patent: Sep. 17, 2013

(54) COATING LIQUID FOR MANUFACTURING ELECTRODE PLATE, UNDERCOATING AGENT, AND USE THEROF

(75) Inventors: Satoshi Yamazaki, Sagamihara (JP); Takaya Sato, Tsuruoka (JP); Takanori Sannan, Chuo-ku (JP); Nobuyuki Kobayashi, Chuo-ku (JP); Shinya Tsuchida, Chuo-ku (JP)

(73) Assignees: Kyoritsu Chemical & Co., Ltd., Chiyoda-ku, Tokyo (JP); Dainichiseika Color & Chemicals Mfg. Co., Ltd., Chuo-ku, Tokyo (JP)

( * ) Notice: Subject to any disclaimer, the term of this patent is extended or adjusted under 35 U.S.C. 154(b) by 878 days.

(21) Appl. No.: 12/309,781

(22) PCT Filed: Apr. 24, 2007

(86) PCT No.: PCT/JP2007/058836
§ 371 (c)(1),
(2), (4) Date: Jan. 29, 2009

(87) PCT Pub. No.: WO2008/015828
PCT Pub. Date: Feb. 7, 2008

(65) Prior Publication Data
US 2009/0257171 A1    Oct. 15, 2009

(30) Foreign Application Priority Data
Aug. 4, 2006   (JP) ................................. 2006-213786

(51) Int. Cl.
*H01G 9/00* (2006.01)

(52) U.S. Cl.
USPC ........................................ 361/502; 429/129

(58) Field of Classification Search
USPC ........................................ 361/502–505, 525
See application file for complete search history.

(56) References Cited

U.S. PATENT DOCUMENTS

| 5,115,077 A * | 5/1992 | Matsuo et al. ................ 528/125 |
| 6,721,168 B2 | 4/2004 | Takeuchi et al. |
| 2002/0122980 A1* | 9/2002 | Fleischer et al. .............. 429/213 |
| 2004/0096733 A1* | 5/2004 | Shibamoto et al. ............ 429/94 |

(Continued)

FOREIGN PATENT DOCUMENTS

| EP | 1 225 647 A2 | 7/2002 |
| JP | 63-010456 A | 1/1988 |

(Continued)

OTHER PUBLICATIONS

European Patent Office, Supplementary European Search Report for European Patent Application No. EP 07 74 2271, Nov. 8, 2011, European Patent Office, Munich, Germany.

*Primary Examiner* — Courtney Smith
(74) *Attorney, Agent, or Firm* — Chapman and Cutler LLP

(57) ABSTRACT

This invention relates to a coating formulation for manufacturing an electrode plate, which contains a solution of a hydroxyalkylchitosan and an organic acid and/or its derivative in an aprotic polar solvent, and an active material added to the solution and kneaded with the solution, the electrode plate, a manufacturing process of the electrode plate, a battery, a capacitor, and an undercoating formulation. According to this invention, a coating formulation for manufacturing an electrode plate for a nonaqueous electrolyte secondary battery or an electrode plate for an electric double layer capacitor having excellent adhesion and improved contact resistance between an active material layer and a collector, the electrode plate, its manufacturing process, the battery and the capacitor can be provided.

6 Claims, 4 Drawing Sheets

(56) References Cited

U.S. PATENT DOCUMENTS

| | | | |
|---|---|---|---|
| 2005/0231894 A1* | 10/2005 | Yoshida et al. | 361/502 |
| 2009/0087491 A1* | 4/2009 | Boury et al. | 424/489 |
| 2010/0015514 A1* | 1/2010 | Miyagi et al. | 429/129 |

FOREIGN PATENT DOCUMENTS

| | | | |
|---|---|---|---|
| JP | 1-33850 A | 2/1989 | |
| JP | 3-285262 A | 12/1991 | |
| JP | 6-204085 A | 7/1994 | |
| JP | 8-225626 A | 9/1996 | |
| JP | 10-321231 A | 12/1998 | |
| JP | 11-317333 A | 11/1999 | |
| JP | 2002-025867 A | 1/2002 | |
| JP | 2002-105241 A | 4/2002 | |
| JP | 2003-206409 A | 7/2003 | |
| JP | 2006-202577 A | 8/2006 | |
| KR | 2004-0038047 A | 5/2004 | |
| WO | WO 2007/043515 A1 | 4/2007 | |

* cited by examiner

COATING LIQUID FOR MANUFACTURING ELECTRODE PLATE, UNDERCOATING AGENT, AND USE THEROF

TECHNICAL FIELD

This invention relates to a coating formulation for manufacturing an electrode plate for a nonaqueous electrolyte secondary battery (which may hereinafter be called simply "battery") represented, for example, by a lithium ion secondary battery or an electrode plate for an electric double layer capacitor (which may hereinafter be called simply "capacitor"), an undercoating layer, the electrode plate, its manufacturing process, the battery, and the capacitor.

BACKGROUND ART

In recent years, increasing size and weight reductions are under way in electronic equipment and communication equipment, leading to a stronger demand for size and weight reductions on secondary batteries to be employed as drive power supplies in them. To meet these demands, batteries represented by lithium ion secondary batteries having high energy density and high voltage have been proposed as replacements for conventional alkaline batteries.

Concerning electrode plates which considerably affect the performance of secondary batteries, on the other hand, it has been proposed to form them into thinner films of larger areas with a view to providing the secondary batteries with longer charge-discharge cycle life and higher energy density. As disclosed, for example, in Patent Document 1, Patent Document 2, etc., there have been disclosed positive electrode plates each obtained by adding a dispersion or solution of a conductive aid and a binder in a suitable moistening agent (solvent) to powder of a positive-electrode active material such as a metal oxide, sulfide, halide or the like to prepare a paste-like active material coating formulation, providing a collector made of a metal foil as a substrate, and then applying the coating formulation onto the substrate to form a coating layer (active material layer).

Further, capacitors each of which makes use of an electric double layer formed at an interface between a polarizable electrode plate and an electrolyte are used as memory backup power supplies, and their application to those requiring a large capacity such as power supplies for electric cars is now attracting attention. For a large capacity, it is required to achieve both a high capacitance and a low internal resistance. Electrode plates for capacitors are generally manufactured by applying a coating formulation, which is a mixture of a binder, an active material, a conductivity-imparting agent and the like, onto collectors and then drying the coating formulation like the above-described negative electrode plates for batteries.

As the binder for use in the above-described coating formulation for the battery or capacitor electrode plate, a fluorinated resin such as polyfluorinated vinylidene or a siliconeacrylic copolymer is used, for example. Negative electrode plates (batteries) and polarizable electrode plates (capacitors) are each obtained by adding a solution of a binder in a suitable moistening agent (solvent) to an active material such as a carbonaceous material to prepare a paste-like active material coating formulation and then applying the coating formulation onto a collector. In the above-described coated electrode plates, the binder employed to prepare the active material coating formulation is required to be electrochemically stable to a nonaqueous electrolyte and to be free from dissolution into the electrolyte of the batteries or capacitors, to remain free from swelling by the electrolyte, and further to be soluble in a solvent to permit the coating.

Patent Document 1: JP-A-63-010456
Patent Document 2: JP-A-03-285262

DISCLOSURE OF THE INVENTION

Problems to be Solved by the Invention

In the battery or capacitor electrode plate obtained by applying the above-described coating formulation onto the collector, the active material layer (coating layer) formed by the coating and drying is accompanied by problems such that its adhesion to the collector and its flexibility are insufficient, its contact resistance to the collector is high, and peeling, flaking, cracking and/or the like of the active material layer takes place during assembly steps of the battery or capacitor or upon charging and discharging the same.

Objects of the present invention are, therefore, to provide a coating formulation for manufacturing an electrode plate of a battery or a polarizable electrode plate of a capacitor, in which an active material layer has excellent adhesion to a collector and is also equipped with improved contact resistance to the collector, an undercoating formulation, the electrode plate and its manufacturing process, the battery, and the capacitor.

Means for Solving the Problems

It is to be noted that positive-electrode active materials such as lithium cobaltate, negative-electrode active materials such as graphite and electrode active materials such as activated carbon in batteries and electric double layer capacitors may be all called "active materials" in the present invention.

The above-described objects can be achieved by the present invention to be described hereinafter. Described specifically, the present invention provides a coating formulation for manufacturing an electrode plate (which may hereinafter be called simply "a coating formulation"), comprising: a solution of a hydroxyalkylchitosan and an organic acid and/or a derivative thereof in an aprotic polar solvent (which may hereinafter be called simply "a hydroxyalkylchitosan solution"), and an active material added to and kneaded with the solution.

In the above-described coating formulation, the hydroxyalkylchitosan may preferably be at least one hydroxyalkylchitosan selected from hydroxyethylchitosan, hydroxypropylchitosan, hydroxybutylchitosan and glycerylated chitosan; the coating formulation may preferably further comprise, as a conductive aid, one of acetylene black, Ketjenblack, and other carbon-based conductive aids; the aprotic polar solvent may preferably be at least one solvent selected from the group consisting of N,N-dimethylformamide, N,N-dimethylacetamide, N-methyl-2-pyrrolidone, N-ethyl-2-pyrrolidone, vinylpyrrolidone, 1,3-dimethyl-2-imidazolidinone, and dimethyl sulfoxide; the organic acid may preferably be a polybasic acid, especially preferably pyromellitic acid and/or trimellitic acid; and the organic acid and/or the derivative thereof may preferably be used in an amount of from 20 to 300 parts by weight per 100 parts by weight of the hydroxyalkylchitosan. The above coating formulation is useful for the manufacture of a battery electrode plate or a capacitor electrode plate.

The present invention also provides an electrode plate for a battery or an electrode plate for a capacitor, comprising: a collector, and an active material layer formed with an active material and a binder on a surface of the collector, wherein the binder is a hydroxyalkylchitosan crosslinked with a polybasic acid. In the above-described electrode plate, the polybasic acid may preferably be pyromellitic acid and/or trimellitic acid; and the polybasic acid and/or a derivative thereof may preferably be used in an amount of from 20 to 300 parts by weight per 100 parts by weight of the hydroxyalkylchitosan.

The present invention also provides a manufacturing process of an electrode plate for a battery or capacitor, comprising: applying a coating formulation for an electrode on a surface of a collector and then drying and heating the coating formulation to form an active material layer, wherein the coating formulation is the above-described coating formulation according to the present invention.

In the above-described manufacturing process, the heating may preferably be conducted at 120 to 250° C. for 1 second to 10 minutes; the collector may preferably be an aluminum foil, the active material may preferably be a positive-electrode active material, and the electrode plate may preferably be a positive electrode; or the collector may preferably be a copper foil, the active material may preferably be a negative-electrode active material, and the electrode plate may preferably be a negative electrode. The present invention also provides a battery or capacitor comprising such electrode plates according to the present invention.

The present invention also provides an undercoating formulation for manufacturing an electrode plate, comprising: a solution of a hydroxyalkylchitosan and an organic acid and/or a derivative thereof in an aprotic polar solvent, and a conductive material added to and kneaded with the solution; an electrode plate for a battery or an electrode plate for a capacitor, comprising: an undercoat layer formed with the undercoating formulation, and an active material layer (conductive layer) formed on the undercoat layer; and a battery or capacitor, comprising the electrode plate.

Advantageous Effects of the Invention

According to the present invention, the hydroxyalkylchitosan, which has been crosslinked by forming the active material layer while using the hydroxyalkylchitosan solution as a binder for the active material layer and heating the layer to crosslink the hydroxyalkylchitosan with the organic acid and/or the derivative thereof, does not dissolve in or swell with an electrolyte, the active material layer is excellent in the adhesion to the collector and is pronouncedly reduced in the contact resistance to the collector, and the active material layer has good flexibility. It is, therefore, possible to obtain an electrode plate, battery and capacitor, which do not develop peeling, flaking, cracking or the like of the active material layer in assembly steps of the battery or capacitor or upon charging and discharging the battery or capacitor.

BEST MODES FOR CARRYING OUT THE INVENTION

Figure 1:
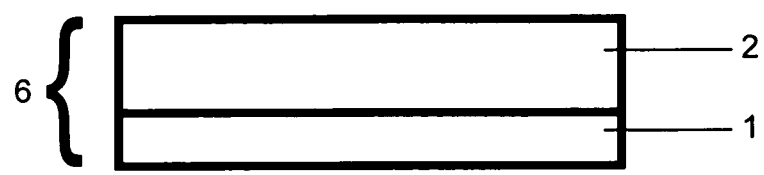
FIG. 1 is a diagram representing the layers of an electrode plate for a secondary battery or double layer capacitor according to a first aspect of the invention.

The present invention will next be described in further detail based on preferred embodiments.
[Coating Formulation]

The coating formulation according to the present invention is characterized by the use of the solution, which contains the hydroxyalkylchitosan and the organic acid and/or the derivative thereof, as a binder for the active material layers in the battery and capacitor electrode plates.

A hydroxyalkylchitosan, a derivative of chitosan, is a water-soluble substance, and is conventionally known to be useful in dissolving a mixture of the hydroxyalkylchitosan and an organic acid and/or a derivative thereof in an aqueous medium and forming a hydrophilic coating on a surface of an aluminum substrate or the like (JP-A-2002-105241).

However, when an aqueous solution of such a hydroxyalkylchitosan was used as a binder in a coating formulation for manufacturing an electrode plate, the aqueous solution was low in the compatibility with an active material and a conductive aid so that an active layer had low adhesion to a collector as a substrate, thereby failing to solve the problems of the conventional art. Moreover, it was difficult to completely eliminate water from the active material layer formed from the coating formulation, thereby making it difficult to form a fully-satisfactory active material layer.

The present inventors have conducted an investigation to obtain a solution of a hydroxyalkylchitosan in an organic solvent, and as a result, have found that the addition of the hydroxyalkylchitosan together with an organic acid and/or a derivative thereof to a specific organic solvent can render the hydroxyalkylchitosan soluble in the organic solvent. It has also been found that, when an active material layer is formed by using a solution of the hydroxyalkylchitosan in the organic solvent as a binder for the active material layer, the organic acid and/or the derivative thereof acts as a crosslinking agent for the hydroxyalkylchitosan upon heating and drying, the hydroxyalkylchitosan becomes no longer soluble in or swellable with an electrolyte, and therefore, an active material layer having excellent adhesion to a collector can be formed.

The solution of the hydroxyalkylchitosan, which is useful in the present invention, is characterized by the inclusion of the hydroxyalkylchitosan and the organic acid and/or the derivative thereof in the aprotic polar solvent.

The hydroxyalkylchitosan for use in the present invention preferably has a structure that like hydroxyethylchitosan, hydroxypropylchitosan, hydroxybutylchitosan or glycerylated chitosan, the corresponding alkylene oxide or oxiranemethanol is added to the amino groups of chitosan, and can be produced preferably by reacting chitosan with the corresponding alkylene oxide or oxiranemethanol. It is, however, to be noted that the hydroxyalkylchitosan for use in the present invention is not limited to such hydroxyalkylchitosans and hydroxyalkylchitosans produced by other processes can also be used likewise. It is also to be noted that plural alkylene oxides and oxiranemethanol may be used either singly or in combination.

In the present invention, the term "hydroxyalkylchitosan" is used with a meaning that embraces therein "glycerylated chitosan". However, "hydroxyalkylchitosan" and "glycerylated chitosan" may hereinafter be distinguished from each other by referring the reaction product of chitosan and an alkylene oxide as "a hydroxyalkylchitosan" and the reaction product of chitosan and oxiranemethanol as "glycerylated chitosan".

The hydroxyalkylchitosan for use in the present invention can be produced by dispersing chitosan in a water-containing alcohol medium such as, for example, water-containing isopropyl alcohol or in water under stirring, adjusting the thus-obtained dispersion alkaline, for example, with sodium hydroxide or the like, adding the alkylene oxide, and then heating the resultant mixture with stirring. On the other hand, the glycerylated chitosan for use in the present invention can be produced by dispersing chitosan beforehand, for example, in water-containing isopropyl alcohol under stirring, adding oxiranemethanol to the dispersion, and then heating the resultant mixture with stirring From the standpoint of the solubility of such a hydroxyalkylchitosan in an aprotic polar solvent, the degree of addition of a corresponding alkylene oxide or oxiranemethanol to chitosan [the degree of hydroxyalkylation (no unit)] may preferably be 0.2 (mole) or greater but 4 (moles) or less per pyranose ring (mole of pyranose). To obtain such a hydroxyalkylation degree, it is desired, upon production of the hydroxyalkylchitosan, to add and react 0.3 (mole) or greater but 10 (moles) or less of the alkylene oxide or oxiranemethanol per pyranose ring (mole pyranose) that makes up chitosan. A hydroxylation degree lower than 0.2 is insufficient from the standpoint of the solubility of the hydroxyalkylchitosan in the aprotic polar solvent. Even when the hydroxylation degree exceeds 4, on the other hand, the solubility of the hydroxyalkylchitosan in the aprotic polar solvent does not change so that the setting of the hydroxyalkylation degree of the hydroxyalkylchitosan beyond 4 is uneconomical.

In the present invention, no particular limitation is imposed on the source of chitosan as a raw material for the hydroxyalkylchitosan and the production process of the hydroxyalkylchitosan, and chitosan products which have been industrially manufactured to date are all usable. Further, no particular limitation is imposed either on the deacetylation degree or polymerization degree of chitosan. Preferably, however, the deacetylation degree of chitosan may be 30% or higher, with 70% to 100% being more preferred and 80% to 100% being still more preferred.

Preferred as chitosan can be such chitosan that as an aqueous solution containing the chitosan at 1 wt % and acetic acid at 1 wt %, the viscosity of the aqueous solution (20° C.) ranges from 1 mPa·s to 10,000 mPa·s. A deacetylation degree of lower than 30% is insufficient from the standpoint of the solubility of a hydroxyalkylchitosan, which is available from the reaction with the corresponding alkylene oxide or oxiranemethanol, in the aprotic polar solvent. If the above-described viscosity (20° C.) is lower than 1 mPa·s, the active material layer to be formed using the hydroxyalkylchitosan will be insufficient in strength. If the above-described viscosity (20° C.) is higher than 10,000 mPa·s, on the other hand, a solution of the resulting hydroxyalkylchitosan will have an excessively high viscosity (20° C.) so that the concentration of the hydroxyalkylchitosan will have to be limited at a very low level. Therefore, viscosities outside the above-described range are not preferred.

Chitosan, which is employed as a raw material for the hydroxyalkylchitosan to be used in the present invention, may more preferably be one having a deacetylation degree of from 80% to 100% and, as an aqueous solution containing 1 wt % of the chitosan and 1 wt % of acetic acid, giving a viscosity (20° C.) of from 3 mPa·s to 100 mPa·s from the standpoints of the solubility of the resulting hydroxyalkylchitosan and the strength of the resulting coating.

As the organic acid or its derivative for use in the present invention, those known to date can each be used, including organic acids such as salicylic acid, pyromellitic acid, citric acid, trimellitic acid, malic acid, pyrrolidonecarboxylic acid, polymaleic acid, phthalic acid, succinic acid and 1,2,3,4-butanetetracarboxylic acid. Preferred can be polybasic acids, their acid anhydrides, and salts of some or all of the carboxyl groups of such polybasic acids, notably their ammonium salts and amine salts and alkyl esters, amides, imides, amide-imides and the like of some or all of the carboxyl groups of such polybasic acids, and derivatives obtained by modifying at least ones of carboxyl groups of these compounds with N-hydroxysuccinimide, N-hydroxysulfosuccinimide or a derivative thereof. Preferred as derivatives of these polybasic acids are compounds which regenerate polybasic acids upon heating of active material layers to be formed subsequently.

From the aspects of the solubility of the hydroxyalkylchitosan in the organic solvent and the crosslinkability of the hydroxyalkylchitosan, pyromellitic acid and trimellitic acid, each of which is a trivalent or higher aromatic polycarboxylic acid, and their acid anhydrides are preferred. In the hydroxyalkylchitosan solution in the present invention, the organic acid and/or its derivative may be used preferably in an amount of from 20 to 300 parts by weight per 100 parts by weight of the hydroxyalkylchitosan. Use of the organic acid and/or its derivative in an amount of smaller than 20 parts by weight results in a crosslinked hydroxyalkylchitosan having a lower crosslink density, so that the resulting active material layer is insufficient in the adhesion to the collector and also in the insolubility, non-swellability and electrochemical stability of the crosslinked hydroxyalkylchitosan to the electrolyte. On the other hand, use of the organic acid and/or its derivative in an amount of greater than 300 parts by weight leads to the formation of an active material layer with reduced flexibility, and moreover, is uneconomical.

As the aprotic polar solvent for use in the present invention, those known to date can each be used. Examples include ethers (diethyl ether, diisopropyl ether, tetrahydrofuran, 1,2-dioxane, etc.), carbonates (ethylene carbonate, ethyl methyl carbonate, diethyl carbonate, dimethyl carbonate, propylene carbonate, butylene carbonate, etc.), amides (formamide, N-methylformamide, N-ethylformamide, N,N-dimethylformamide, N,N-diethylformamide, acetamide, N-methylacetamide, N-ethylacetamide, N,N-dimethylacetamide, N,N-diethylacetamide, N-methyl-2-pyrrolidone, N-ethyl-2-pyrrolidone, vinylpyrrolidone, piperidone, N-methylpiperidone, N-ethylpiperidone, hexamethylphosphoric triamide, 1,3-dimethyl-2-imidazolidinone, methyloxazolidinone, ethyloxazolidinone, etc.), sulfoxides (dimethyl sulfoxide, etc.), and sulfones (tetramethylene sulfone, etc.). Among these, N,N-dimethylformamide, N,N-dimethylacetamide, N-methyl-2-pyrrolidone, N-ethyl-2-pyrrolidone, vinylpyrrolidone, 1,3-dimethyl-2-imidazolidinone and dimethyl sulfoxide are more preferred. These aprotic polar solvents may be used either singly or in combination.

As the organic acid and/or its derivative and a protic polar solvent for use in the present invention, general commercial products can be used as they are, or they may be used after purification as needed. Concerning the hydroxyalkylchitosan, one produced by the above-described process may be used with the reaction solvent, byproducts and/or the like still contained therein, or may be used after purification.

As the order of addition of the hydroxyalkylchitosan and the organic acid and/or its derivative to the aprotic polar solvent upon their dissolution in the solvent to prepare the hydroxyalkylchitosan solution for use in the present invention, either the hydroxyalkylchitosan or the organic acid and/or its derivative may be added first or they may be added at the same time. As their dissolution method, stirring may be conducted with heating as needed although stirring at room temperature is sufficient.

The concentration of the hydroxyalkylchitosan in the hydroxyalkylchitosan solution for use in the present invention may range preferably from 1 to 40 wt %, more preferably from 5 to 10 wt % from the viewpoints of coating applicability, transport cost and the like. A concentration lower than 1 wt % makes it difficult to obtain a stable active material layer, while a concentration higher than 40 wt % makes it hard to obtain a homogeneous solution.

[Application to Battery Electrode Plate and Battery]

As the positive-electrode active material among the active materials usable in the coating formulation according to the present invention, it is possible to use, for example, one or a combination of plural of lithium oxides such as $LiCoO_2$, $LiNiO_2$ and $LiMn_2O_4$ and chalcogen compounds such as $TiS_2$, $MnO_2$, $MoO_3$ and $V_2O_5$. As the negative-electrode active material, on the other hand, metal lithium, a lithium alloy, a carbonaceous material such as graphite, carbon black or acetylene black, or a material that intercalates lithium ions can be used preferably.

In the present invention, it is preferred to use a conductive aid in combination with the above-described active material. Usable examples of the conductive aid include acetylene black, Ketjenblack and other carbonaceous conductive aids, with the use of acetylene black being particularly preferred.

The coating formulation according to the present invention can be obtained by adding the active material and, if necessary, the conductive aid to the solution of the hydroxyalkylchitosan and the organic acid and/or its derivative in the organic solvent and then kneading the resultant mixture. The proportions of the respective components in the coating formulation may preferably be 1 to 10 parts by weight of the hydroxyalkylchitosan, 0.5 to 30 parts by weight of the organic acid and/or its derivative, and 1 to 15 parts by weight of the conductive aid (when used), when the active material is assumed to amount to 100 parts by weight. Further, the solid content of the coating formulation may preferably range from 10 to 80 wt %.

If the hydroxyalkylchitosan is used in an amount smaller than 1 parts by weight in the foregoing, the resulting active material layer may be provided with insufficient strength and insufficient adhesion to the collector. If the hydroxyalkylchitosan is used in an amount greater than 10 parts by weight, on the other hand, the resulting active material layer may be provided with reduced electrical conductivity.

If the organic acid and/or its derivative is used in an amount smaller than 0.5 parts by weight, the resulting active material layer may be provided with insufficient strength, insufficient adhesion to the collector, and insufficient electrochemical stability to the electrolyte. If the organic acid and/or its derivative is used in an amount greater than 30 wt %, on the other hand, the resulting active material layer may be provided with reduced flexibility.

When the conductive aid is used although its use is not essential, the use of the conductive aid in an amount smaller than 1 parts by weight may provide the resulting active material layer with insufficient electrical conductivity. If the conductive aid is used in an amount greater than 15 parts by weight, on the other hand, the remaining components may become deficient so that the resulting active material layer may be provided with reduced performance.

The coating formulation according to the present invention may further contain optional components other than the above-described components, for example, other crosslinking agents and the like. Examples of such other crosslinking agents include epoxy compounds such as ethylene glycol diglycidyl ether, polyethylene glycol diglycidyl ether and glycerol polyglycidyl ether; isocyanate compounds such as toluoylene diisocyanate, xylylene diisocyanate, hexamethylene diisocyanate and phenyl diisocyanate, and blocked isocyanate compounds formed by blocking such isocyanate compounds with blocking agents such as phenols, alcohols, active methylene compounds, mercaptans, acid-amides, imides, amines, imidazoles, ureas, carbamic acids, imines, oximes or sulfites; aldehyde compounds such as glyoxal, glutaraldehyde, and dialdehyde starch; (meth)acrylate compounds such as polyethylene glycol diacrylate, polyethylene glycol dimethacrylate and hexanediol diacrylates; methylol compounds such as methylolmelamine and dimethylol urea; organic acid metal salts such as zirconyl acetate, zirconyl carbonate and titanium lactate; metal alkoxide compounds such as aluminum trimethoxide, aluminum tributoxide, titanium tetraethoxide, titanium tetrabutoxide, zirconium tetrabutoxide, aluminum dipropoxide acethylacetonate, titanium dimethoxide bis(acetylacetonate) and titanium dibutoxide bis(ethylacetoacetate); carbodiimide compounds; and the like. The use of such a crosslinking agent is not essential. When to be employed, however, the amount of the crosslinking agent may suitably range from 0.1 to 200 wt % based on the hydroxyalkylchitosan.

A description will be made about a specific process for the preparation of the coating formulation for use in the present invention. Firstly, a powdery active material, which is selected as desired from materials such as those mentioned above, and if necessary, a powdery conductive aid are added to the solution of the hydroxyalkylchitosan and the organic acid and/or its derivative in the organic solvent such that they are contained in the above-described proportions. Using a conventionally-known disperser such as a homogenizer, ball mill, sand mill or roll mill or a conventionally-known kneader such as a planetary mixer, the resultant mixture is mixed and dispersed to prepare the coating formulation according to the present invention.

The manufacturing process of the electrode plate according to the present invention is characterized by the use of the above-described coating formulation according to the present invention. Examples of the collector for use in the manufacture of the electrode plate include, as positive electrode collectors, aluminum, tantalum, niobium, titanium, hafnium, zirconium, zinc, tungsten, bismuth and antimony; and as negative electrode collectors, metal foils such as a copper foil. As the positive electrode collector, aluminum is preferred for its excellent corrosion resistance to the electrolyte, its light weight, and its easy machine workability. As the thickness of the metal foil, a metal foil of from 10 to 30 µm or so can be used. These collectors may be treated beforehand at surfaces thereof with a coupling agent such as a silane-based, titanate-based or aluminum-based coupling agent.

The electrode plate can be obtained by applying the coating formulation onto the surface of the collector to a dry thickness in a range of from 10 to 200 µm, preferably in a range of from 50 to 180 µm by using one of various coating methods such as gravure coating, gravure reverse coating, roll coating, Meyer bar coating, blade coating, knife coating, air knife coating, comma coating, slot die coating, slide die coating or dip coating, and then drying the thus-applied coating formulation under heat.

Upon drying under heat, the coating can be heated preferably at 100° C. or higher for 1 second or longer, more preferably at 120 to 250° C. for 1 second to 10 minutes so that the hydroxyalkylchitosan (binder) can be fully crosslinked to provide the resulting active material layer with improved adhesion to the collector and also to provide the binder with improved electrochemical stability to the electrolyte. Heat treatment conditions of lower than 100° C. or shorter than 1 second may fail to provide the active material layer with sufficient adhesion to the collector and also to provide the binder with satisfactory electrochemical stability to the electrolyte.

To improve the uniformity of the active material layer formed by conducting the coating and heat treatment as described above, it is also preferred to form the electrode plate according to the present invention by applying pressing treatment to the active material layer while using metal rolls, heating rolls, a sheet press or the like. As pressing conditions for the pressing treatment, a press pressure of lower than 500 kgf/cm$^2$ can hardly provide the active material layer with uniformity, while a press pressure of higher than 7,500 kgf/cm$^2$ breaks the electrode plate itself including the collector. As the pressing conditions, a range of from 500 to 7,500 kgf/cm$^2$ is therefore preferred.

The electrode plate 6 obtained as described above has, on the surface of the collector 1, the active material layer 2 formed of the active material and the hydroxyalkylchitosan (binder) crosslinked by the organic acid, especially the polybasic acid, and the active material layer has such properties as described above, as depicted in FIG. 1.

Figure 3:
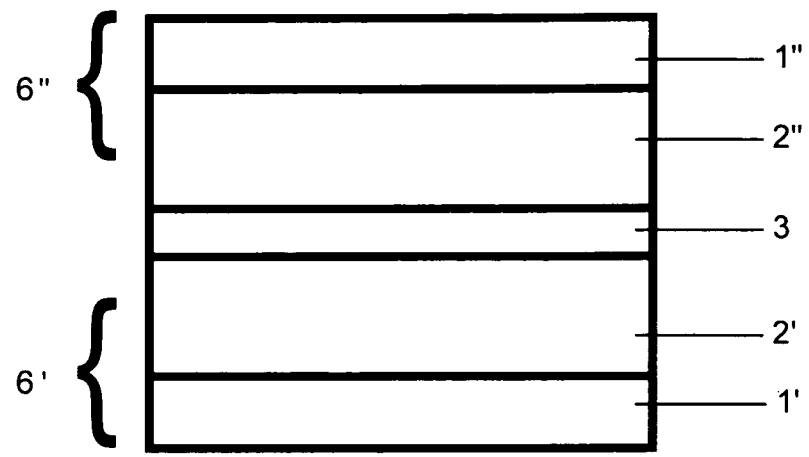
FIG. 3 is a diagram representing the layers of a secondary battery according to a first aspect of the invention.

When manufacturing a nonaqueous electrolyte secondary battery, as depicted in FIG. 3, for example, a lithium-based secondary battery by using the positive electrode plate 6' and negative electrode plate 6" of the present invention produced as described above, a nonaqueous electrolyte with a lithium salt dissolved as a solute in an organic solvent is used as an electrolyte. Usable examples of the lithium salt as the solute that forms the nonaqueous electrolyte include inorganic lithium salts such as $LiClO_4$, $LiBF_4$, $LiPF_6$, $LiAsF_6$, $LiCl$ and $LiBr$; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$ and $LiOSO_2C_7F_{15}$.

As the organic solvent employed upon formation of the nonaqueous electrolyte, a cyclic ester, a linear ester, a cyclic ether, a linear ether or the like can be mentioned. Illustrative of the cyclic ester are ethylene carbonate, propylene carbonate, butylene carbonate, γ-butyrolactone, vinylene carbonate, 2-methyl-γ-butyrolactone, acetyl-γ-butyrolactone, and γ-valerolactone.

Illustrative of the linear ester are dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates.

Illustrative of the cyclic ether are tetrahydrofuran, alkyltetrahydrofurans, dialkylalkyltetrahydrofurans, alkoxytetrahydrofurans, dialkoxytetrahydrofurans, 1,3-dioxolane, alkyl-1,3-dioxolanes, and 1,4-dioxolane. Illustrative of the linear ether are 1,2-dimethoxyethane, 1,2-diethoxyethane, diethyl ether, ethylene glycol dialkyl ethers, diethylene glycol dialkyl ethers, triethylene glycol dialkyl ethers, and tetraethylene glycol dialkyl ethers. It is to be noted that the remaining construction of the battery is similar to that in the conventional art.

[Application to Capacitor Electrode Plate and Capacitor]

A description will hereinafter be made of a case that the coating formulation according to the present invention is applied to the manufacture of a capacitor electrode plate and a capacitor. The coating formulation for the capacitor electrode plate contains the above-described hydroxyalkylchitosan solution and the electrode active material, and if necessary, also contains a conductivity-imparting agent.

The electrode active material for use in the present invention can be a carbonaceous material having a specific surface are of preferably 30 m$^2$/g or greater, more preferably from 500 to 5,000 m$^2$/g, still more preferably from 1,000 to 3,000 m$^2$/g, and powder or fibers such as activated carbon, polyacene, carbon whiskers or graphite can be used. The electrode active material may preferably be activated carbon. As the activated carbon, phenol-based, rayon-based, acrylic, pitch-based or coconut shell activated carbon can be used. It is also possible to use, as the electrode active material, nonporous carbon having graphite-like microcrystalline carbon atoms and an increased interlayer distance between the microcrystalline carbon atoms and disclosed, for example, in JP-A-11-317333 or JP-A-2002-025867. The particle size of the electrode active material may range preferably from 0.1 to 100 μm, more preferably from 1 to 20 μm, because this particle size range facilitates the formation of the electrode layer as a thin coating for the capacitor electrode plate and also provides the electrode layer with a higher capacity density.

The amount of the hydroxyalkylchitosan in the coating formulation may range preferably from 0.1 to 20 parts by weight, more preferably from 0.5 to 10 parts by weight in terms of solid content per 100 parts by weight of the electrode active material. An unduly small amount of the hydroxyalkylchitosan makes the electrode active material and conductivity-imparting material easier to fall off from the electrode, while an excessively large amount of the hydroxyalkylchitosan covers the electrode active material under the hydroxyalkylchitosan and therefore has a potential problem in that the internal resistance of the electrode plate may increase.

The coating formulation may preferably contain a conductivity-imparting material. As the conductivity-imparting material, conductive carbon such as acetylene black, Ketjenblack or carbon black can be used. Such conductive carbon is used as a mixture with the electrode active material. The combined use of the conductivity-imparting agent can further improve the electrical contact of the active material itself, and can provide the capacitor with reduced internal resistance and a higher capacity density. The conductivity-imparting agent may be used in an amount of generally from 0.1 to 20 parts by weight, preferably from 2 to 10 parts by weight per 100 parts by weight of the electrode active material.

The coating formulation can be produced by mixing the hydroxyalkylchitosan solution, the electrode active material and, if necessary, the conductivity-imparting agent in a mixer. As the mixer, a ball mill, sand mill, pigment disperser, mix-muller, ultrasonic disperser, homogenizer, planetary mixer, Hobart mixer, or the like can be used. Also preferred is a method that firstly mixes the electrode active material and the conductivity-imparting agent in a mixer such as a mix-muller, planetary mixer, Henschel mixer or omni-mixer homogenizer, adds the hydroxyalkylchitosan solution, and then mixes them into a uniform mixture. Adoption of this method makes it possible to readily obtain a uniform coating formulation.

The capacitor electrode plate according to the present invention is obtained by applying the coating formulation, which contains the hydroxyalkylchitosan solution, the electrode active material and, if necessary, the conductivity-imparting agent, onto a collector and then drying the coating formulation to form an electrode layer. As the collector, a material having electrical conductivity and electrochemical durability can be used. From the viewpoint of the possession of heat resistance, a metal material such as aluminum, titanium, tantalum, stainless steel, gold or platinum is preferred, with aluminum or platinum being particularly preferred. No particular limitation is imposed on the shape of the collector. In general, however, a sheet-shaped collector having a thickness of from 0.001 to 0.5 mm or so can be employed.

No particular limitation is imposed on the forming method of the electrode layer. Preferred is a method that applies the coating formulation for the capacitor electrode onto a collector and then dries the coating formulation to form an electrode layer on the collector. As an application method of the coating formulation onto the collector, a method such as doctor blade coating, dip coating, reverse roll coating, direct roll coating, gravure coating, extrusion coating, brush coating or spray coating can be mentioned.

The viscosity of the coating formulation may be generally from 100 to 100,000 mPa·s, preferably from 1,000 to 50,000 mPa·s, more preferably 5,000 to 20,000 mPa·s, although it differs depending on the type of the coating machine and the layout of the coating line. No particular limitation is imposed on the amount of the coating formulation to be applied. In general, however, the coating formulation may be applied in such an amount that the electrode layer to be formed subsequent to the elimination of the solvent by drying will have a thickness of usually from 0.005 to 5 mm, preferably from 0.01 to 0.3 mm.

The drying method and drying conditions for the coating layer are similar to those described above in connection with the battery electrode plate.

Figure 4:
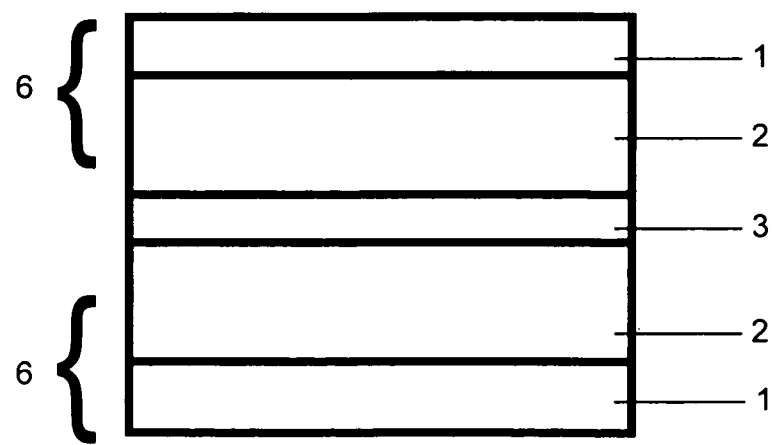
FIG. 4 is a diagram representing the layers of a double layer capacitor according to a first aspect of the invention.

The capacitor according to the present invention, as depicted in FIG. 4, which has the above-described electrode plate, can be manufactured in a usual manner by using parts such as the electrode plates 6,6, the electrolyte and a separator 3. Described specifically, it can be manufactured, for example, by stacking the electrode plates 6,6 together with the separator 3 interposed therebetween, rolling or folding the resultant stack into a form conforming to the capacitor, placing the rolled or folded stack in a can, filling the electrolyte into the can, and sealing the can.

The electrolyte may preferably be, but is not limited particularly to, a nonaqueous electrolyte with an electrolyte dissolved in an organic solvent. As the electrolyte, any electrolyte known to date can be used. Illustrative are tetraethylammonium tetrafluoroborate, triethylmonomethylammonium tetrafluoroborate, tetraethylammonium hexafluorophosphate, and the like.

No particular limitation is imposed on the solvent (electrolyte solvent) for dissolving such an electrolyte, insofar as it is commonly employed as an electrolyte solvent. Specific examples include carbonates such as propylene carbonate, ethylene carbonate and butylene carbonate; lactones such as γ-butyrolactone; sulfolanes; and nitriles such as acetonitrile. They can be used either singly or in combination. Among these, carbonates are preferred for their high withstand voltage. The concentration of the electrolyte may be generally 0.5 mole/L or higher, preferably 0.8 mole/L or higher.

As the separator, a known separator can be used such as a microporous membrane or nonwoven fabric made of a polyolefin such as polyethylene or polypropylene as a principal material; or a porous membrane made of pulp as a principal raw material and generally called "electrolytic capacitor paper". A separator may also be formed by dispersing inorganic ceramic powder and a binder in a solvent, coating the resultant dispersion onto an electrode layer, and then drying the coating. A solid electrolyte or gel electrolyte may also be used instead of such a separator. As other materials such as a can, those employed in usual capacitors are all usable.

[Undercoating Formulation]

The undercoating formulation according to the present invention is characterized in that it is obtainable by adding a conductive material to the hydroxyalkylchitosan solution and kneading the resultant mixture. The hydroxyalkylchitosan solution for use in the undercoating formulation is the same as that mentioned above under the [Coating formulation]. Further, the conductive material is the same as the conductive material mentioned above under the [Application to battery electrode plate and battery]. The amount of the conductive material to be added to the hydroxyalkylchitosan solution and the method for applying the undercoating formulation onto the collector or substrate are the same as those described above.

The conventional batteries and electric double layer capacitors are each accompanied by the problems mentioned above under the Background Art, specifically, the problems of the poor adhesion between the electrode layer and the collector (substrate) and the high resistance between the electrode layer and the substrate. To solve these problems, a variety of undercoating formulations (primers) have been proposed. The adhesion problem has been solved by an undercoat layer formed from such an undercoating formulation, but due to the undercoat layer, the resistance between the electrode layer and the collector has become still higher, thereby failing to solve the problems.

Figure 7:
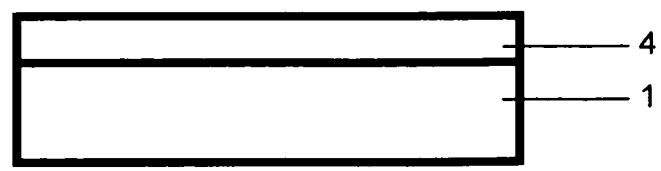
FIG. 7 is a diagram representing the layers of a collector with an undercoat layer.
Figure 8:
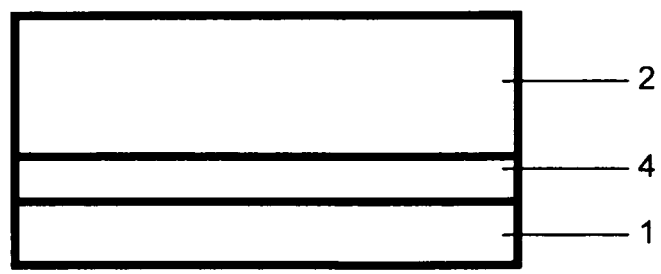
FIG. 8 is a diagram representing the layers of a collector with an undercoat layer and an active material layer.

The present inventors have found that the adhesion between the electrode layer and the collector 1 can be significantly improved, while lowering the resistance between the electrode layer and the collector rather than increasing it at all, by applying the undercoating formulation of the present invention onto a surface of a collector 1, as seen in FIG. 7, to a thickness of from 0.2 to 100 μm, preferably from 1.0 to 50 μm in terms of solid content to form an undercoat layer 4, and forming an active material layer 2 in the form of a positive electrode layer, a negative electrode layer or a capacitor electrode layer on the undercoat layer 4, as seen in FIG. 8.

Figure 2:
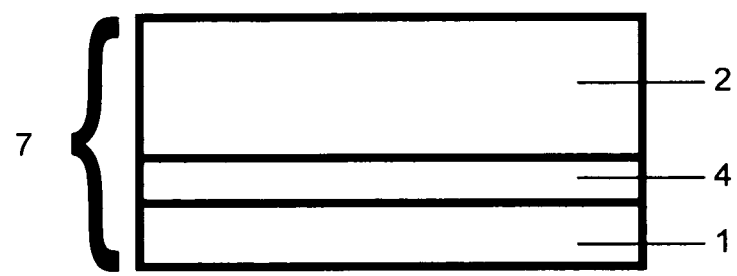
FIG. 2 is a diagram representing the layers of an electrode plate for a secondary battery or double layer capacitor according to a second aspect of the invention.

Accordingly, as depicted in FIG. 2, the present invention provides a battery electrode plate or capacitor electrode plate characterized in that an active material layer 2 is formed on the undercoat layer 4 formed from the undercoating formulation; and a battery or capacitor characterized by having the electrode plate 7.

It is to be noted that the binder, which forms the active material layer or electrode layer in the electrode plate, may be the above-described hydroxyalkylchitosan solution or as an alternative, a conventionally-known binder, for example, a known binder such as polyfluorinated vinylidene, polytetrafluoroethylene, an acrylic resin or a silicone-acrylic resin. Especially with the above-described known binders, it has been essential to chemically treat, for example, a surface of an aluminum foil to bring about improved adhesion between the electrode layer and the collector. The use of the undercoating formulation according to the present invention can obviate such cumbersome and costly, chemical treatment and can realize still better adhesion and lower resistance. It is, therefore, possible to provide a battery and capacitor of high efficiency and high service life.

EXAMPLES

The present invention will next be described more specifically based on Examples and Comparative Examples. It is to be noted that all designations of "part", "parts" or "%" in the following Examples and Comparative Examples are on a weight basis unless otherwise specifically indicated.

<Preparation of Glycerylated Chitosan Solutions>

The compositions of individual glycerylated chitosan solutions employed in the Examples and Comparative Examples are shown in Table 1. The expression "viscosity of 1% raw chitosan solution" in the table indicates the viscosity of a 1 wt % acetic acid solution containing 1 wt % of chitosan as a raw material for the corresponding glycerylated chitosan (viscosity measuring method: measured by a Brookfield rotational viscometer under the conditions consisting of a measuring temperature of 20° C. and a measuring rotation speed of 30 rpm). Concerning aprotic polar solvents used in the respective glycerylated chitosan solutions, the following abbreviations are used: NMP (N-methyl-2-pyrrolidone), NEP (N-ethyl-2-pyrrolidone), DMF (N,N-dimethylformamide), DMSO (dimethylsulfoxide), DMAc (N,N-dimethylacetamide), and DMI (1,3-dimethyl-2-imidazolidinone).

a slurry-form, positive-electrode coating formulation with the positive-electrode active material contained therein.

Using the positive-electrode coating formulation obtained as described above and employing, as a substrate, a collector 1' formed of a 20-μm thick aluminum foil, the positive-electrode coating formulation was applied onto one side of the substrate by a "COMMA ROLL COATER". The thus-coated substrate was then dried for 2 minutes in an oven controlled at 110° C., and was further dried for 2 minutes in the oven controlled at 150° C. to eliminate the solvent and to have the binder crosslinked, so that a positive electrode plate 6' with an active material layer 2' formed with a dry thickness of 100 μm on the collector 1' was obtained. The positive electrode plate obtained by the above-described procedure was pressed under conditions of 5,000 kgf/cm$^2$ to make the coating uniform. Subsequently, aging was conducted for 48 hours in a vacuum oven controlled at 80° C. to fully eliminate volatiles (the solvent, the unreacted polybasic acid, etc.).

TABLE 1-1

Glycerylated Chitosan Solutions

| | Viscosity of 1% raw chitosan solution (mPa·s) | Glycerylated chitosan Glyceryl-ation degree | Parts | Organic acid Kind | Parts | Aprotic polar solvent Kind | Parts |
|---|---|---|---|---|---|---|---|
| Sample 1 | 130 | 1.8 | 2 | Maleic acid | 2 | NMP | 96 |
| Sample 2 | 15 | 1.5 | 3 | Phthalic anhydride | 3 | NMP | 94 |
| Sample 3 | 6 | 1.1 | 10 | Pyromellitic acid | 5 | NMP | 85 |
| Sample 4 | 6 | 1.1 | 5 | Succinic anhydride | 5 | NMP | 90 |
| Sample 5 | 6 | 2.3 | 5 | Trimellitic acid | 1 | NMP | 94 |
| Sample 6 | 6 | 1.1 | 5 | Pyromellitic acid | 5 | NMP | 90 |
| Sample 7 | 6 | 1.1 | 5 | Pyromellitic acid | 5 | NEP | 90 |
| Sample 8 | 6 | 1.1 | 5 | Pyromellitic acid | 5 | DMAc | 90 |
| Sample 9 | 6 | 1.1 | 5 | Pyromellitic acid | 5 | DMI | 90 |
| Sample 10 | 6 | 1.1 | 5 | Pyromellitic acid | 5 | DMF | 90 |
| Sample 11 | 6 | 1.1 | 5 | Pyromellitic acid | 5 | DMSO | 90 |
| Sample 12 | 8 | 3.2 | 10 | — | — | NMP | 90 |

[Application to Batteries]

Example 1

Coating Formulation, Electrode Plate

A positive-electrode coating formulation employed in this Example and containing a positive-electrode active material was prepared by the procedure to be described hereinafter. As materials for the positive-electrode coating formulation, $LiCoO_2$ powder having particle sizes of from 1 to 100 μm, acetylene black as a conductive aid and the solution of Sample 4 described above in Table 1 were stirred and mixed at a mixing ratio of 90 parts, 5 parts and 50 parts at a rotation speed of 60 rpm for 120 minutes in a planetary mixer to obtain Parallel lines, which consisted of perpendicularly-intersecting 11 vertical lines and 11 horizontal lines, were drawn by a cutter at intervals of 1 mm on the active material layer to form 100 squares within 1 cm$^2$. A mending tape was applied to the surface of the active material layer, and tape peeling was then conducted. The number of squares which were not peeled off was determined as a measure of adhesiveness. The average of 10 tests was 98.0 squares. Further, the conditions of the active material layer were observed after the electrode plate with the squares formed thereon as described above was immersed at 50° C. for 24 hours in a mixed solvent of EC (ethylene carbonate), PC (propylene carbonate) and DME (dimethoxyethane) combined together at a volume ratio of 1:1:2. One developed no changes is indicated as "not equipped" under "solubility/swellability", while one with its active material layer having been peeled or swollen is indicated as "equipped" under "solubility/swellability".

Examples 2-11, Comparative Examples 1-2

Coating Formations and Electrode Plates

Positive electrode plates were produced as in Example 1 except that the glycerylated chitosan solutions described below in Table 2 were used in place of the glycerylated chitosan solution in Example 1. Each positive electrode plate was tested for the adhesion of the active material layer to the collector and the solubility/swellability of the active material layer as in Example 1. The results described below in Table 2 were obtained. It is to be noted that a 5% solution (PVDF solution) of polyvinylidene fluoride was used in Comparative Example 2.

through a drying step, it was dried for 2 minutes in the oven controlled at 110° C., and was further dried for 2 minutes in the oven controlled at 150° C. to eliminate the solvent and to have the binder crosslinked, so that an active material layer 2'' was formed with a dry thickness of 100 μm on the collector. A negative electrode plate 6'' obtained by the above-described procedure was pressed under conditions of 5,000 kgf/cm² to make the coating uniform. Subsequently, aging was conducted for 48 hours in a vacuum oven controlled at 80° C. to fully eliminate volatiles (the solvent, the unreacted polybasic acid, etc.).

Parallel lines, which consisted of perpendicularly-intersecting 11 vertical lines and 11 horizontal lines, were drawn by a cutter at intervals of 1 mm on the active material layer to form 100 squares within 1 cm². A mending tape was applied to the surface of the active material layer, and tape peeling was then conducted. The number of squares which were not

TABLE 2

| Ex./Comp. Ex. | Glycerylated chitosan solution | Amount of glycerylated chitosan solution used per 100 parts of active material (parts; solid content) | Adhesion (average value) | Solubility/ swellability |
|---|---|---|---|---|
| Example 1 | Sample 4 | 2.5 | 98 | Not equipped |
| Example 2 | Sample 1 | 5 | 99 | Not equipped |
| Example 3 | Sample 2 | 3 | 90 | Not equipped |
| Example 4 | Sample 3 | 8 | 99 | Not equipped |
| Example 5 | Sample 5 | 2 | 95 | Not equipped |
| Example 6 | Sample 6 | 1 | 96 | Not equipped |
| Example 7 | Sample 7 | 1 | 95 | Not equipped |
| Example 8 | Sample 8 | 2 | 95 | Not equipped |
| Example 9 | Sample 9 | 3 | 96 | Not equipped |
| Example 10 | Sample 10 | 3 | 97 | Not equipped |
| Example 11 | Sample 11 | 5 | 99 | Not equipped |
| Comp. Ex. 1 | Sample 12 | 5 | 99 | Equipped |
| Comp. Ex. 2 | PVDF soln. | 5 | 27 | Not equipped |

Example 12

Coating Formulation, Electrode Plate

A negative-electrode coating formulation employed in this Example and containing a negative-electrode active material was prepared by the procedure to be described next. Carbon powder obtained by thermal degradation of coal coke at 1,200° C., acetylene black as a conductive aid and the solution of Sample 6 described above in Table 1 were stirred and mixed at a mixing ratio of 90 parts, 5 parts and 80 parts at a rotation speed of 60 rpm for 120 minutes in the planetary mixer to obtain a slurry-form coating formulation with the negative-electrode active material contained therein.

The coating formulation containing the negative-electrode active material and obtained as described above was applied onto a copper-foil collector 1'' by using the "COMMA ROLL COATER". After the thus-coated collector 1'' was processed peeled off was determined as a measure of adhesiveness. The average of 10 tests was 96 squares. The solubility/swellability of the active material layer was evaluated as in Example 1.

Examples 13-22, Comparative Examples 3-4

Coating Formations and Electrode Plates

Negative electrode plates were produced as in Example 12 except that the glycerylated chitosan solutions described below in Table 3 were used in place of the glycerylated chitosan solution in Example 12. Each negative electrode plate was tested for the adhesion of the active material layer to the collector and the solubility/swellability of the active material layer as in Example 12. The results described below in Table 3 were obtained. It is to be noted that a 5% solution (PVDF solution) of polyvinylidene fluoride was used in Comparative Example 4.

TABLE 3

| Ex./Comp. Ex. | Glycerylated chitosan solution | Amount of glycerylated chitosan solution used per 100 parts of active material (parts; solid content) | Adhesion (average value) | Solubility/ swellability |
|---|---|---|---|---|
| Example 12 | Sample 6 | 4 | 96 | Not equipped |
| Example 13 | Sample 1 | 5 | 96 | Not equipped |
| Example 14 | Sample 2 | 3 | 89 | Not equipped |
| Example 15 | Sample 3 | 8 | 98 | Not equipped |
| Example 16 | Sample 4 | 2 | 95 | Not equipped |
| Example 17 | Sample 5 | 1 | 94 | Not equipped |

TABLE 3-continued

| Ex./Comp. Ex. | Glycerylated chitosan solution | Amount of glycerylated chitosan solution used per 100 parts of active material (parts; solid content) | Adhesion (average value) | Solubility/ swellability |
|---|---|---|---|---|
| Example 18 | Sample 7 | 3 | 93 | Not equipped |
| Example 19 | Sample 8 | 3 | 96 | Not equipped |
| Example 20 | Sample 9 | 3 | 98 | Not equipped |
| Example 21 | Sample 10 | 3 | 99 | Not equipped |
| Example 22 | Sample 11 | 5 | 98 | Not equipped |
| Comp. Ex. 3 | Sample 12 | 5 | 98 | Equipped |
| Comp. Ex. 4 | PVDF soln. | 5 | 34 | Not equipped |

Example 23

Battery

An electrode unit, as seen in FIG. 3, was first constructed by using the positive electrode plate 6' of Example 1 and the negative electrode plate 6" of Example 12, and rolling them into a volute form with a separator 3 interposed therebetween. The separator was made of a porous polyolefin (polypropylene, polyethylene or a copolymer thereof) film having a width broader than the positive electrode plate and a three-dimensional porous (spongy) structure. The electrode unit was then inserted into a bottomed cylindrical, stainless steel can, which would also serve as a negative electrode terminal, so that a battery of the AA size and 500 mAh rated capacity was assembled. Charged as an electrolyte into the battery was a solution of 1 mole of $LiPF_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of battery characteristics, a charge-discharge measuring instrument was used. Twenty (20) batteries were charged at the temperature condition of 25° C. and the current value of a 0.2 CA charging current, firstly in a charging direction until a battery voltage reached 4.1 V. After a break of 10 minutes, the batteries were discharged at the same current until 2.75 V was reached. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle was 96.

With the batteries making use of the positive electrode plates of Examples 2 to 11 and the negative electrode plates of Examples 13 to 22, excellent results similar to those obtained above were also obtained.

<Preparation of Hydroxyalkylchitosan Solutions>

In Table 4, the compositions of individual hydroxyalkylchitosan solutions employed in Examples 24 and 25 are shown. The abbreviations of the aprotic polar solvents used in the individual hydroxyalkylchitosan solutions are as defined above. The production of the hydroxyalkylchitosans was conducted in a manner known per se in the art. The raw chitosan for the hydroxyalkylchitosans was the same as that employed for Sample 6 in Table 1.

TABLE 4

Hydroxyalkylchitosan Solutions

| | Hydroxyalkylchitosan | | | | | |
|---|---|---|---|---|---|---|
| | Hydroxylalkyl group | Hydroxy-alkylation degree | Parts | Organic acid Kind | Parts | Aprotic polar solvent Kind | Parts |
| Sample 13 | Hydroxyethyl | 1.9 | 5 | Pyromellitic acid | 5 | NMP | 90 |
| Sample 14 | Hydroxypropyl | 1.8 | 5 | Pyromellitic acid | 5 | DMF | 90 |
| Sample 15 | Hydroxybutyl | 1.8 | 5 | Pyromellitic acid | 5 | DMAc | 90 |

[Application to Batteries]

Example 24

Coating Formulation, Electrode Plate

A positive-electrode coating formulation employed in this Example and containing a positive-electrode active material was prepared by the procedure to be described hereinafter. As materials for the positive-electrode coating formulation, $LiCoO_2$ powder having particle sizes of from 1 to 100 μm, acetylene black as a conductive aid and the solution of Sample 13 described above in Table 4 were stirred and mixed at a mixing ratio of 90 parts, 5 parts and 60 parts at a rotation speed of 60 rpm for 120 minutes in a planetary mixer to obtain a slurry-form, positive-electrode coating formulation with the positive-electrode active material contained therein.

Using the positive-electrode coating formulation obtained as described above and employing, as a substrate, a collector formed of a 20-μm thick aluminum foil, the positive-electrode coating formulation was applied onto one side of the substrate by the "COMMA ROLL COATER". The thus-coated substrate was then dried for 2 minutes in an oven controlled at 110° C., and was further dried for 2 minutes in the oven controlled at 150° C. to eliminate the solvent and to have the binder crosslinked, so that a positive electrode plate with an active material layer formed with a dry thickness of 100 μm on the collector was obtained. The positive electrode plate obtained by the above-described procedure was pressed under conditions of 5,000 kgf/cm² to make the coating uniform. Subsequently, aging was conducted for 48 hours in a vacuum oven controlled at 80° C. to fully eliminate volatiles (the solvent, the unreacted polybasic acid, etc.).

Parallel lines, which consisted of perpendicularly-intersecting 11 vertical lines and 11 horizontal lines, were drawn by a cutter at intervals of 1 mm on the active material layer to form 100 squares within 1 cm². A mending tape was applied to the surface of the active material layer, and tape peeling was then conducted. The number of squares which were not peeled off was determined as a measure of adhesiveness. The average of 10 tests was 98.0 squares. Further, the conditions of the active material layer were observed after the electrode plate with the squares formed thereon as described above was immersed at 50° C. for 24 hours in a mixed solvent of EC (ethylene carbonate), PC (propylene carbonate) and DME (dimethoxyethane) combined together at a volume ratio of 1:1:2. Neither peeling nor swelling of the active material layer was recognized. Similar results were obtained when hydroxypropylchitosan and hydroxybutylchitosan in Table 4 were used.

Example 25

Coating Formulation, Electrode Plate

A negative-electrode coating formulation employed in this Example and containing a negative-electrode active material was prepared by the procedure to be described next. Carbon powder obtained by thermal degradation of coal coke at 1,200° C., acetylene black as a conductive aid and the solution of Sample 14 described above were stirred and mixed at a mixing ratio of 90 parts, 5 parts and 80 parts at a rotation speed of 60 rpm for 120 minutes in the planetary mixer to obtain a slurry-form coating formulation with the negative-electrode active material contained therein.

The coating formulation containing the negative-electrode active material and obtained as described above was applied onto a copper-foil collector by using the "COMMA ROLL COATER". After the thus-coated collector was processed through a drying step, it was dried for 2 minutes in the oven controlled at 110° C., and was further dried for 2 minutes in the oven controlled at 150° C. to eliminate the solvent and to have the binder crosslinked, so that an active material layer was formed with a dry thickness of 100 μm on the collector. A negative electrode plate obtained by the above-described procedure was pressed under conditions of 5,000 kgf/cm² to make the coating uniform. Subsequently, aging was conducted for 48 hours in a vacuum oven controlled at 80° C. to fully eliminate volatiles (the solvent, the unreacted polybasic acid, etc.).

Parallel lines, which consisted of perpendicularly-intersecting 11 vertical lines and 11 horizontal lines, were drawn by a cutter at intervals of 1 mm on the active material layer to form 100 squares within 1 cm². A mending tape was applied to the surface of the active material layer, and tape peeling was then conducted. The number of squares which were not peeled off was determined as a measure of adhesiveness. The average of 10 tests was 96 squares. Neither peeling nor swelling of the active material layer was recognized. Similar results were obtained when hydroxyethylchitosan and hydroxybutylchitosan in Table 4 were used.

Example 26

Battery

An electrode unit, as shown in FIG. 3, was first constructed by using the positive electrode plate 6' of Example 24 and the negative electrode plate 6" of Example 25 and rolling them into a volute form with a separator 3 interposed therebetween: The separator 3 was made of a porous polyolefin (polypropylene, polyethylene or a copolymer thereof) film having a width broader than the positive electrode plate and a three-dimensional porous (spongy) structure. The electrode unit was then inserted into a bottomed cylindrical, stainless steel can, which would also serve as a negative electrode terminal, so that a battery of the AA size and 500 mAh rated capacity was assembled. Charged as an electrolyte into the battery was a solution of 1 mole of $LiPF_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of battery characteristics, a charge-discharge measuring instrument was used. Twenty (20) batteries were charged at the temperature condition of 25° C. and the current value of a 0.2 CA charging current, firstly in a charging direction until a battery voltage reached 4.1 V. After a break of 10 minutes, the batteries were discharged at the same current until 2.75 V was reached. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle was 96.

[Application to Capacitors]

Example 1

The glycerylated chitosan solution of Sample 3 (5 parts in terms of solid content), high-purity activated carbon powder (specific surface area: 1,500 m²/g, average particle size: 10 μm; 100 parts) as an electrode active material and acetylene black (4 parts) as a conductivity-imparting agent were charged in a planetary mixer, and NMP was added to give a total solid concentration of 43%, followed by mixing for 60 minutes. Subsequently, the mixture was diluted with NMP to a solid concentration of 41%, followed by further mixing for 10 minutes to obtain a coating formulation. Using a doctor blade, the coating formulation was applied onto a 20-μm thick aluminum foil, followed by drying at 80° C. for 30 minutes in a fan dryer. Using a roll press, pressing was then conducted to obtain a capacitor electrode plate having a thickness of 80 μm and a density of 0.6 g/cm³. The electrode plate was tested for its adhesion to the collector and its solubility/swellability to the solvent as in Example 1 of the [Application to batteries]. The results are shown in Table 5.

From the electrode plate 6 as seen in FIG. 4, produced as described above, two discs were cut out with a diameter of 15 mm. Those discs were dried at 20° C. for 20 hours. Those two electrode discs were arranged with their electrode layer sides opposing each other, and a cellulose-made, disc-shaped separator of 18 mm in diameter and 40 μm in thickness was held between the electrode discs. The thus-obtained electrode unit was placed in a coin-shaped package made of stainless steel (diameter: 20 mm, height: 1.8 mm, stainless steel thickness: 0.25 mm) and equipped with a polypropylene-made packing.

An electrolyte was charged into the can such that no air was allowed to remain. A 0.2-mm thick stainless steel cap was put and fixed on the package with the polypropylene-made packing interposed therebetween. The can was then sealed to produce a coin-shaped capacitor of 20 mm in diameter and about 2 mm in thickness. As the electrolyte, a solution with tetraethylammonium tetrafluoroborate dissolved at a concentration of 1 mole/L in propylene carbonate was employed. The capacitor obtained as described above was measured for capacitance and internal resistance. The results are shown in Table 5.

Example 2

As in Example 1 except that the glycerylated chitosan solution of Sample 6 was used at the same solid content in place of the glycerylated chitosan solution employed in Example 1, an electrode plate and capacitor were produced, and the respective characteristics were evaluated. The results are shown in Table 5.

Example 3

As in Example 1 except that the hydroxyethylchitosan solution of Sample 13 was used at the same solid content in place of the glycerylated chitosan solution employed in Example 1, an electrode plate and capacitor were produced, and the respective characteristics were evaluated. The results are shown in Table 5.

Example 4

As in Example 1 except that the hydroxypropylchitosan solution of Sample 14 was used at the same solid content in place of the glycerylated chitosan solution employed in Example 1, an electrode plate and capacitor were produced, and the respective characteristics were evaluated. The results are shown in Table 5.

Example 5

As in Example 1 except that the hydroxybutylchitosan solution of Sample 15 was used at the same solid content in place of the glycerylated chitosan solution employed in Example 1, an electrode plate and capacitor were produced, and the respective characteristics were evaluated. The results are shown in Table 5.

Comparative Example 1

As in Example 1 except that the glycerylated chitosan solution of Sample 12 was used at the same solid content in place of the glycerylated chitosan solution employed in Example 1, an electrode plate and capacitor were produced, and the respective characteristics were evaluated. The results are shown in Table 5.

Comparative Example 2

As in Example 1 except that a 5% solution of polyvinylidene fluoride was used at the same solid content in place of the glycerylated chitosan solution employed in Example 1, an electrode plate and capacitor were produced, and the respective characteristics were evaluated. The results are shown in Table 5.

The internal resistance and capacitance described below in Table 5 were measured and evaluated as will be described next.

With respect to each capacitor produced, its capacitance and internal resistance were measured at a current density of 20 mA/cm$^2$, and based on Comparative Example 2 as a reference, the capacitance and internal resistance were evaluated in accordance with the following evaluation standards, respectively. The greater the capacitance and the lower the internal resistance, the better the performance as a capacitor.
(Evaluation Standards for Capacitance)
    A: Capacitance greater by 20% or more than Comparative Example 2.
    B: Capacitance greater by 10% or more but less than 20% than Comparative Example 2.
    C: Capacitance equal to or smaller than Comparative Example 2.
(Evaluation Standards for Internal Resistance)
    A: Internal resistance lower by 20% or more than Comparative Example 2.
    B: Internal resistance lower by 10% or more but less than 20% than Comparative Example 2.
    C: Internal resistance equal to or higher than Comparative Example 2.

TABLE 5

| | Adhesion (average value) | Solubility/ swellability | Capacitance | Internal resistance |
|---|---|---|---|---|
| Example 1 | 99 | Not equipped | A | A |
| Example 2 | 95 | Not equipped | A | A |
| Example 3 | 97 | Not equipped | A | A |
| Example 4 | 99 | Not equipped | A | A |
| Example 5 | 98 | Not equipped | A | A |
| Comp. Ex. 1 | 99 | Equipped | B | B |
| Comp. Ex. 2 | 32 | Not equipped | — | — |

As evident from the above Examples and Comparative Examples, a capacitor of large capacitance and low internal resistance can be obtained when an electrode plate is produced using the coating formulation according the present invention and the capacitor is manufactured using the electrode plate.
[Undercoating Formulations]

Example 1

Undercoating Formulation, Electrode Plate

An undercoating formulation employed in this Example and containing a conductive material was prepared by the procedure to be described hereinafter. Acetylene black as a conductive material and the solution of Sample 6 described above in Table 1 were stirred and mixed at a mixing ratio of 10 parts and 90 parts at a rotation speed of 60 rpm for 120 minutes in a planetary mixer to obtain a slurry-form undercoating formulation.

Using the undercoating formulation obtained as described above and employing, as a substrate, a collector formed of a 20-μm thick aluminum foil, the undercoating formulation was applied onto one side of the substrate by the "COMMA ROLL COATER". The thus-coated substrate was then dried for 2 minutes in an oven controlled at 110° C., and was further dried for 2 minutes in the oven controlled at 150° C. to eliminate the solvent and to have the binder crosslinked, so that an undercoat layer was formed with a dry thickness of 1 μm on the collector.

A positive-electrode coating formulation containing a positive-electrode active material was next prepared by the procedure to be described hereinafter. As materials for the positive-electrode coating formulation, LiCoO$_2$ powder having particle sizes of from 1 to 100 μm, acetylene black as a conductive aid and a 5% solution of polyvinylidene fluoride (PVDF solution) as a binder were stirred and mixed at a mixing ratio of 90 parts, 5 parts and 50 parts at a rotation speed of 60 rpm for 120 minutes in a planetary mixer to obtain a slurry-form, positive-electrode coating formulation with the positive-electrode active material contained therein.

Figure 5:
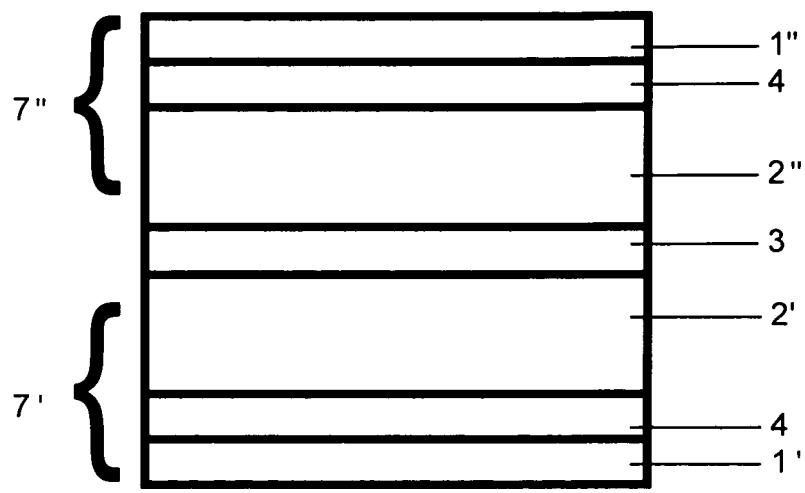
FIG. 5 is a diagram representing the layers of a secondary battery according to a second aspect of the invention.

Using the positive-electrode coating formulation obtained as described above, it was applied onto the surface of the undercoat layer 4 by the "COMMA ROLL COATER". The thus-coated substrate was then dried for 2 minutes in an oven controlled at 110° C., and was further dried for 2 minutes in the oven controlled at 150° C. to eliminate the solvent, so that a positive electrode plate 7' with an active material layer 2' formed with a dry thickness of 100 μm on the undercoat layer 4 was obtained, as shown in the diagram of the battery of FIG. 5. The positive electrode plate 7' obtained by the above-described procedure was pressed under conditions of 5,000 kgf/cm$^2$ to make the coating uniform. Subsequently, aging was conducted for 48 hours in a vacuum oven controlled at 80° C. to fully eliminate volatiles (the solvent, the unreacted polybasic acid, etc.), so that a positive electrode plate was obtained. With respect to the positive electrode plate, the adhesion and internal resistance were measured similarly to the foregoing, and were evaluated in accordance with the same standards as described above. The results described in Table 6 were obtained.

Examples 2-5

Undercoating Formulations, Electrode Plates

Undercoating formulations were prepared as in Example 1 except that the glycerylated chitosan solutions described below in Table 6 were used in place of the glycerylated chitosan solution for the undercoating formulation in Example 1, and then, electrode plates were produced as in Example 1. With respect to each of the electrode plates, the adhesion of the active material layer and the internal resistance were measured similarly to the foregoing, and were evaluated in accordance with the same standards as described above. The results described in Table 6 were obtained.

Comparative Example 1

An electrode plate with an active material layer formed thereon was produced as in Example 1 except that the undercoat layer was not formed. The adhesion of the active material layer and the internal resistance were measured similarly to the foregoing, and were evaluated in accordance with the same standards as described above. The results described in Table 6 were obtained.

TABLE 6

| Ex./Comp. Ex. | Glycerylated chitosan solution | Adhesion (average value) | Internal resistance |
|---|---|---|---|
| Ex. 1 | Sample 6 | 98 | A |
| Ex. 2 | Sample 1 | 99 | A |
| Ex. 3 | Sample 2 | 90 | A |
| Ex. 4 | Sample 3 | 99 | A |
| Ex. 5 | Sample 5 | 95 | A |
| Comp. Ex. 1 | — | 34 | B |

Example 6

A negative electrode plate (7" in FIG. 5) was produced as in Comparative Example 4 of the [Application to batteries] except that an undercoat layer 4 was formed using the undercoating formulation employed above in Example 1. It was found to have excellent adhesion and internal resistance as in Example 1.

Example 7

Figure 6:
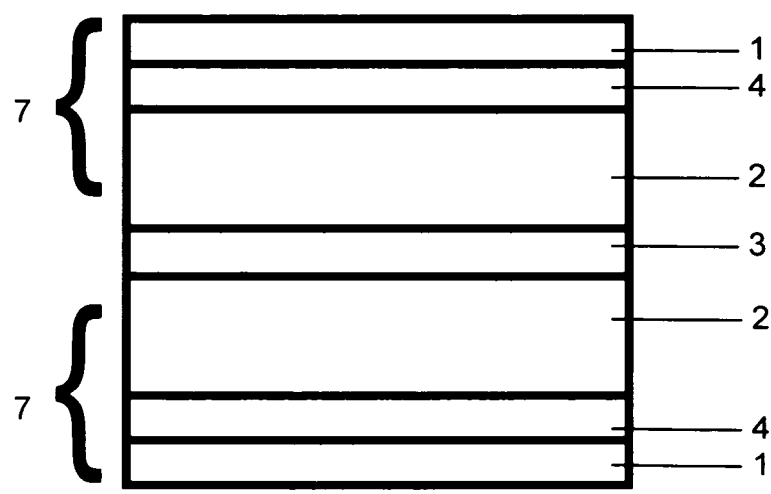
FIG. 6 is a diagram representing the layers of a double layer capacitor according to a second aspect of the invention.

A capacitor as depicted in FIG. 6 was produced as in Comparative Example 2 of the [Application to capacitors] except that an undercoat layer 4 was formed using the undercoating formulation employed above in Example 1. It was found to have excellent adhesion and internal resistance as in Example 1 of the [Application to capacitors].

INDUSTRIAL APPLICABILITY

As has been described above, the present invention forms an active material layer and/or an undercoat layer by using a solution containing a hydroxyalkylchitosan as a binder for the active material layer and an organic acid and/or a derivative thereof, and heats these layers to have the hydroxyalkylchitosan crosslinked with the organic acid and/or the derivative thereof. This crosslinked hydroxyalkylchitosan does not dissolve in or swell with an electrolyte, the active material layer and/or the undercoat layer is excellent in the adhesion to a collector and is pronouncedly reduced in the contact resistance to the collector, and the active material layer and/or the undercoat layer has good flexibility. It is, therefore, possible to obtain an electrode plate, battery, capacitor electrode plate and capacitor, which do not develop peeling, flaking, cracking or the like in assembly steps of the battery or upon charging and discharging the battery.

The invention claimed is:

1. An undercoating formulation for manufacturing an electrode plate, comprising: a solution of a hydroxyalkylchitosan and a polybasic acid and/or a derivative thereof in an aprotic polar solvent, and a conductive material added to and kneaded with said solution, wherein said polybasic acid is pyromellitic acid and/or trimellitic acid, and said polybasic acid and/or said derivative thereof is used in an amount of from 20 to 300 parts by weight per 100 parts by weight of said hydroxyalkylchitosan.

2. A collector comprising an undercoat layer formed on a surface thereof by applying the undercoating formulation of claim 1 to the collector and then heating said undercoating formulation.

3. A collector according to claim 2, further comprising an active material layer formed on said undercoat layer.

4. An undercoating formulation according to claim 1, wherein said hydroxyalkylchitosan is at least one hydroxyalkylchitosan selected from the group consisting of hydroxyethylchitosan, hydroxypropylchitosan, hydroxybutylchitosan and glycerylated chitosan.

5. An undercoating formulation according to claim 1, wherein said conductive material is one of acetylene black, Ketjenblack, and other carbon-based conductive aids.

6. An undercoating formulation according to claim 1, wherein said aprotic polar solvent is at least one solvent selected from the group consisting of N,N-dimethylformamide, N,N-dimethylacetamide, N-methyl-2-pyrrolidone, N-ethyl-2-pyrrolidone, vinylpyrrolidone, 1,3-dimethyl-2-imidazolidinone, and dimethyl sulfoxide.

\* \* \* \* \*